(12) United States Patent
Sun et al.

(10) Patent No.: US 6,896,724 B2
(45) Date of Patent: May 24, 2005

(54) PIGMENTED INKS AND METHODS TO IMPROVE INK PERFORMANCE

(75) Inventors: Jing Sun, Lexington, KY (US); Paul J Sacoto, Lexington, KY (US); Naiyu Sun, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/330,041

(22) Filed: Dec. 26, 2002

(65) Prior Publication Data

US 2004/0127619 A1 Jul. 1, 2004

(51) Int. Cl.⁷ .............................................. C09D 11/10
(52) U.S. Cl. ................ 106/31.86; 103/31.6; 103/31.85; 523/160; 523/161; 347/100; 347/101
(58) Field of Search ............................ 106/31.86, 31.6, 106/31.85; 523/160, 161; 347/101, 100

(56) References Cited

U.S. PATENT DOCUMENTS

| 5,364,461 A | 11/1994 | Beach et al. |
| 5,719,204 A | 2/1998 | Beach et al. |
| 5,891,231 A * | 4/1999 | Gnerlich et al. ......... 106/31.86 |
| 6,053,317 A | 4/2000 | Morris et al. |
| 6,644,799 B2 * | 11/2003 | Han-Adebekun et al. ... 347/100 |

FOREIGN PATENT DOCUMENTS

WO     WO 02102905 A1    12/2002

* cited by examiner

*Primary Examiner*—Robert D. Harlan
(74) *Attorney, Agent, or Firm*—John A. Brady (57) ABSTRACT

The present invention relates to a pigment dispersion and a method of producing a pigment dispersion by grinding a grind mixture comprising a pigment, a humectant, water, and a polymeric dispersant. The invention also relates to an ink composition comprising an aqueous carrier and a pigment dispersion produced by grinding a grind mixture comprising a pigment, a humectant, water, and a polymeric dispersant. The invention also relates to an ink composition comprising a pigment, a polymeric dispersant, a humectant, a basic dye, an aqueous carrier, wherein the pH of the ink composition is less than or equal to 7.

27 Claims, 1 Drawing Sheet

PIGMENTED INKS AND METHODS TO IMPROVE INK PERFORMANCE

FIELD OF INVENTION

This invention relates to ink compositions comprising a dispersion produced by grinding a grind mixture comprising an insoluble colorant, a polymeric dispersant, water, and a humectant.

BACKGROUND

Ink jet printing is a non-impact method of printing that involves ejecting ink from a nozzle onto paper or other print media. The actual ink ejection method may occur via several processes including pressurized nozzles, electrostatic fields, piezoelectric elements within an ink nozzle, and heaters for vapor phase bubble formation.

The composition of the ink is traditionally comprised of deionized water, a water soluble organic solvent, and a colorant. The colorant may be a soluble dye or insoluble pigment. Several problems, however, are associated with soluble dyes that are not applicable to insoluble pigments. These problems include poor water-fastness, poor light-fastness, poor thermal stability, facile oxidation, dye crystallization, and ink bleeding and feathering on the print medium. To circumvent these problems, use of a pigment as the colorant is preferred. Pigments generally have better light-fast and water-fast properties, are more resistant to oxidation, and have higher thermal stability. However, pigment based inks have some disadvantages as compared to dye-based inks. Due to the insolubility of pigments in water, polymeric dispersants and/or surfactants are typically added to improve the dispersibility of the pigment. Also, because pigments exist as discrete particles in ink, pigments have a strong light scattering effect. As a result, pigmented inks have a lower chroma as compared to dye based inks and often look dull when printed on plain paper. Fiber show through is also a problem when using pigment based inks.

Several methods have been used in an attempt to improve the chroma, dispersability, and performance of pigment based inks. For example, in attempts to improve the chroma of a pigment based ink, additives such as optical brighteners and/or fluorescent whiteners have been added to the ink formulation. Dyes can also be added to pigment based inks in the form of a dyed pigment, polymeric dyes, a polymer resin with an oil soluble dye, or a complex product of dye and polymer. Methods to improve the chroma, dispersability, and performance of pigment based inks may solve some of these problems, but at the same time, other physical qualitities of the ink can be sacrificed.

Further, in an effort to improve color and other print qualities, the drop mass and the nozzle diameter of ink jet print heads has been reduced. To accommodate smaller drop mass and nozzle diameters and simultaneously maintain chroma and performance, pigment based inks require pigment dispersions with improved stability.

Thus, there is a need for pigment based inks comprising a pigment dispersion with improved stability and good chroma.

SUMMARY OF INVENTION

The present invention provides a pigment dispersion and a method of forming a pigment dispersion. The pigment dispersion comprises a pigment, a polymeric dispersant, water, and a first humectant. The method of forming the pigment dispersion comprises: grinding a grind mixture comprising a pigment, a polymeric dispersant, water, and a first humectant. In various embodiments, the pigment dispersion may further comprise a second humectant, a basic dye, a wax, a UV absorber/optical brightener, or mixtures thereof. The pigment dispersion may be used in ink formulations to produce inks with improved reliability and chroma.

The present invention provides an ink composition comprising: an aqueous carrier, and a pigment dispersion produced by grinding a grind mixture comprising a pigment, a polymeric dispersant, water, and a first humectant. In various embodiments, the grind mixture may further comprise a second humectant, basic dye, a wax, a UV absorber/optical brightener, or mixtures thereof.

The present invention also provides an ink composition comprising: a pigment, a polymeric dispersant, a first humectant, a basic dye, and an aqueous carrier, wherein the pH of the ink composition is greater than or equal to 7.

DETAILED DESCRIPTION

Typically in making pigmented ink jet inks, the following steps are followed. A dispersant is dissolved in an aqueous solution, followed by blending a pigment with the dispersant solution to form a concentrate. The concentrate is ground with media in an attritor or mill. Sufficient energy is provided to break down the pigment particles and let the dispersant adsorb onto the pigment surface to form a stable dispersion. This process forms a dispersion with enough stability to produce a reliable ink when used in standard ink jet printers.

More recently, the drop mass and the nozzle diameter of some ink jet print heads has been reduced in an effort to improve the print quality and chroma of the images produced by the printer. For the same reason, dispersants have become more hydrophobic. However, more hydrophobic dispersants are typically more viscous and less stable in aqueous solution. To accommodate these changes, pigment based inks require pigment dispersions with improved stability.

The inventors have found that including a humectant with a grind comprising a pigment, a polymeric dispersant, and water, and grinding the grind mixture can produce a pigment dispersion with improved stability relative to pigment dispersions that are ground without a humectant in the grind mixture. Further, the inventors have found that adding one or more of the same humectants during the ink making process, rather than during the grinding step, may not produce an ink with the same increase in jettability. While not wishing to be bound by any specific theory, the inventors believe that including one or more humectants in the dispersion making process improves the dispersant's association structure and improves the dispersant's interaction with the pigment surface.

In one aspect, the present invention provides a pigment dispersion comprising: a pigment, a polymeric dispersant, water, and a first humectant. In an embodiment, the pH of the pigment dispersion is greater than or equal to 7. In another embodiment, the pigment dispersion may further comprise a second humectant, a basic dye, a wax, a UV absorber/optical brightener, or mixtures thereof.

In another embodiment of the pigment dispersion, the ratio of pigment to dispersant (P:D) ranges from about 1:2 to about 20:1, preferably from about 1:1 to about 15:1, more preferably from about 1:1 to about 5:1.

In another embodiment of the pigment dispersion, the ratio of pigment to the total amount of all humectants ranges from about 20:1 to about 1:4, preferably from about 15:1 to about 1:1, more preferably about 3:1.

In embodiments of the pigment dispersion wherein the pigment dispersion includes a basic dye, the pH of the pigment dispersion is greater than or equal to 7 and the ratio of pigment to basic dye ranges from about 20:1 to about 1:1, preferably from about 10:1 to about 1:1, more preferably from about 8:1 to about 4:1, even more preferably about 6:1.

In another aspect, the present invention provides a method of forming a pigment dispersion comprising: grinding a grind mixture comprising a pigment, a polymeric dispersant, water, and a first humectant. In embodiments, the grind mixture may further comprise a second humectant, a basic dye, a wax, a UV absorber/optical brightener, or mixtures thereof.

In another embodiment of the method of forming a pigment dispersion, the ratio of pigment to dispersant (P:D) in the grind mixture ranges from about 1:2 to about 20:1, preferably from about 1:1 to about 15:1, more preferably from about 1:1 to about 5:1.

In another embodiment of the method of forming a pigment dispersion, the ratio of pigment to the total amount of all humectants in the grind mixture ranges from about 20:1 to about 1:4, preferably from about 15:1 to about 1:1, more preferably about 3:1.

In embodiments of the method of forming a pigment dispersion wherein the grind mixture includes a basic dye, the pH of the grind mixture is greater than or equal to 7. Further, the ratio of pigment to basic dye in the grind mixture ranges from about 20:1 to about 1:1, preferably from about 10:1 to about 1:1, more preferably from about 8:1 to about 4:1, even more preferably about 6:1.

In another embodiment, the method may further comprise the step of: diluting the pigment dispersion with an aqueous solution. In another embodiment, the method may further comprise the step of: filtering the pigment dispersion.

The step of grinding may be accomplished by using any applicable grinding or dispersing apparatus. For example, the step of grinding may be accomplished using conventional milling equipment including smearer-type or shear mills, smasher-type or impact mills, or hybrid mills that provide both shearing and impacting activity. Specific mills include ball mills, high-speed disk impeller mills, high-speed impingement mills, three-roll mills, high-speed stone, bead mills, and high-speed disk dispersers.

The step of grinding may also be accomplished by an attritor or by a horizontal mill. A useful grinding media for an attritor includes spherical ceramic particles having a highly smooth and uniform exterior surface, a high density and high hardness, such as the material commercially available under the name YTZ Ceramic Beads, available from S. E. Firestone Associates, Philadelphia, Pa., and manufactured by Nippon Kagaku Togyo. A useful grinding media for a horizontal mill is polystyrene beads. For example, the Mini 250 Eiger horizontal wet mill, available from Eiger Machinery, Inc., Grayslake, Ill., with polystyrene beads is useful for grinding the grind mixture. Other potential useful grinding media and grind methods are described in U.S. Pat. No. 5,891,231.

In another aspect, the present invention provides an ink composition comprising an aqueous carrier and a pigment dispersion produced by the method described above. Thus, the ink composition comprises: an aqueous carrier and a pigment dispersion produced by grinding a grind mixture comprising a pigment, a polymeric dispersant, water, and a first humectant. In embodiments, the grind mixture may further comprise a second humectant, a basic dye, a wax, a UV absorber/optical brightener, or mixtures thereof. In another embodiment, the pH of the ink composition is greater than or equal to 7. In another embodiment, the pH of the ink composition is greater than or equal to 7.5.

In another embodiment of the ink composition, the ratio of pigment to dispersant (P:D) in the grind mixture ranges from about 1:2 to about 20:1, preferably from about 1:1 to about 15:1, more preferably from about 1:1 to about, 5:1.

In another embodiment of the ink composition, the ratio of pigment to the total amount of all humectants in the grind mixture ranges from about 20:1 to about 1:4, preferably from about 15:1 to about 1:1, more preferably about 3:1.

In embodiments of the ink composition wherein the grind mixture includes a basic dye, the pH of the grind mixture is greater than or equal to 7. Further, the ratio of pigment to basic dye in the grind mixture ranges from about 20:1 to about 1:1, preferably from about 10:1 to about 1:1, more preferably from about 8:1 to about 4:1, even more preferably about 6:1.

In another embodiment, the ink composition comprises a pigment dispersion wherein the method to produce the pigment dispersion may further comprise the step of: diluting the pigment dispersion with an aqueous solution. In another embodiment, the method may further comprise the step of: filtering the pigment dispersion.

In another aspect, the present invention provides an ink composition comprising: a pigment, a polymeric dispersant, a first humectant, a basic dye, an aqueous carrier, wherein the pH of the ink composition is greater than or equal to 7. In another embodiment, the pH of the ink composition is greater than or equal to 7.5. In an embodiment, the ink composition further comprises a second humectant. In another embodiment, the ink composition may further comprise a surfactant, a biocide, a wax, a UV absorber/optical brightener, or mixtures thereof.

In another embodiment of the ink composition, the ratio of pigment to dispersant (P:D) ranges from about 1:2 to about 20:1, preferably from about 1:1 to about 15:1, more preferably from about 1:1 to about 5:1.

In another embodiment of the ink composition, the ratio of pigment to a basic dye ranges from about 20:1 to about 1:1, preferably from about 10:1 to about 1:1, more preferably from about 8:1 to about 4:1, even more preferably about 6:1.

The ink compositions of the present invention generally comprise from about 0.1% to about 10%, preferably from about 1% to about 7%, more preferably from about 2.5% to about 5%, and most preferably about 3%, pigment.

The ink compositions of the present invention generally comprise from about 3% to about 65%, preferably from about 6% to about 50%, more preferably from about 10% to about 30%, even more preferably from about 10% to about 25%, total ink humectant.

The pigments useful in the ink compositions of the present invention are generally not limited. Suitable pigments include organic and inorganic pigments of a particle size sufficient to permit free flow of the ink through the ink jet printing device, specially at the ejecting nozzles that usually have a diameter ranging from about 10 microns to 50 microns. Thus, a suitable pigment particle size is from about 0.05 to about 5, preferably from about 0.05 to about 1, and more preferably from about 0.05 to about 0.5, micron. Suitable pigments further include azo pigments, such as azo lakes, insoluble azo pigments, condensed azo pigments and chelate azo pigments, polycyclic pigments, perylene pigments, anthraquinone pigments, quinacridone pigments, dioxazine pigments, thioindigo pigments, isoindolinone pigments, quinophthalone pigments, and dry lakes. Suitable organic pigments include intro pigments, nitroso pigments, aniline black and daylight fluorescent pigments. Preferred pigments include Pigment Red 122, Pigment Blue 15:3 and 15:4, and Pigment Yellow 74, 128, 138, 155.

The selected pigment may be used in dry or wet form. For example, pigments are usually manufactured in aqueous media, and the resulting pigment is obtained as water wet presscake. In presscake form, the pigment is not aggregated to the extent that it is in dry form.

The polymeric dispersants useful in this invention are generally not limited and include any of those capable of dispersing, for example, pigments, especially colored pigments. The dispersants typically comprise hydrophobic and hydrophilic polymeric segments. The hydrophobic segment tends to interact with the pigment particle in an aqueous ink and the hydrophilic segment tends to be solvated by the aqueous medium thereby dispersing the pigment.

Illustrative examples of the dispersants which may be employed in aqueous inks of invention include AB, BAB and ABC block copolymers known in the art. Preferred AB and BAB block copolymers include those, for example, which comprise hydrophobic and hydrophilic segments derived from acrylic monomers. Another illustrative example of dispersants includes random polymers.

A class of dispersants which may be employed in the present invention include block and/or graft co- or terpolymers comprising a hydrophilic polymeric segment, and one or two hydrophobic polymeric segment(s). A preferred subgroup of these dispersants are graft terpolymers which comprise a hydrophilic polymeric segment (particularly an acrylic or methacrylic acid co- or terpolymer) together with a hydrophobic polymeric segment derived from a polyorganosiloxane as described in U.S. Pat. No. 5,719,204.

A group of preferred polymeric dispersants useful in this invention are graft polymers having an average weight molecular weight of from about 2,500 to about 20,000, preferably of from about 3,000 to about 15,000 and which comprise a hydrophilic segment and a hydrophobic segment. Preferred hydrophilic functional groups include carboxylic acid groups, sulfonic acid groups, phosphate groups. Preferably, the hydrophilic segment is comprised of acrylamidoalkylsulfonic acid, styrene sulfonic acid, or other acid, amide or amine (quateneary amine) containing monomers, preferably a methacrylic acid (MAA) polymer, or a copolymer thereof. Different acid or amine groups may be used together. In an alternate embodiment, the hydrophilic segment can comprise a methacrylic copolymer, such as a copolymer of MAA with another monomer, such as styrene sulfonic acid. Other suitable monomers will be known to those skilled in the art. Suitable monomers are preferably those which do not interfere with the hydrophilic character of the segment.

In an embodiment, the ink compositions of the present invention comprise a dispersant with an acid number of a dispersant is less than or equal to 25. In another embodiment, the acid number is less than or equal to 18. In another embodiment, the acid number is less than or equal 9. Acid number, as used wherein, is defined as the molar ratio of acidic monomers to other monomers in a polymer.

A preferred hydrophobic segment comprises a polymer or copolymer containing electron rich functional groups. Suitable electron rich functional groups will be known to those skilled in the art. Preferred electron-rich hydrophobic functional groups include alkyl aromatics or substituted aromatic groups. More preferred hydrophobic groups include SIPOMER/SEM 25™, which can be purchased from Rhodia Inc., poly(ethylene glycol) 2,4,6-tris-(1-phenylethyl)phenyl ether methacrylate and its di and mono derivates, and polydimethylsiloxane (available from Chisso Corp.), and alkylphenylether of polyethylene glycol or polypropylene glycol groups, such as Aronix M-117 (available from Toagosei Co.).

Examples of hydrophobic segments include, but are not limited to, nonylphenoxy poly(propyleneoxy)-acrylate (containing from 1 to about 40 moles of propylene oxide), nonylphenoxy poly(propyleneoxy)-methacrylate (containing from 1 to about 40 moles of propylene oxide), nonylphenoxy poly(propyleneoxy)-crotonate (containing from about 5 to about 40 moles of propylene oxide), bis-[nonylphenoxy poly(propyleneoxy)]-fumarate (containing from about 5 to about 40 moles of propylene oxide), phenoxypoly(propyleneoxy)acrylate (containing from about 5 to about 40 moles of propylene oxide), 2,4,6-tris-(1-phenylethyl)phenoxy poly(ethyleneoxy) methacrylate and its di- and mono-derivates (containing from about 1 to about 40 moles of ethylene oxide). Mixtures of these materials may be used.

Further examples of hydrophobic segments which may be used a dispersant include, but are not limited to, nonylphenol acrylate, nonylphenol methacrylate, nonylphenoxy poly(propyleneoxy)$_n$ methacrylate, wherein n is from 1 to about 40, preferably from 2 to about 15; nonylphenoxy poly(propyleneoxy)$_n$ acrylate, wherein n is from 1 to about 40, preferably from about 2 to about 15; 2,4,6-tris-(1- phenylethyl)phenoxy poly(ethyleneoxy)$_n$ methacrylate and its di- and mono-derivatives, wherein n is from 1 to about 40, preferably from about 2 to 25.

Humectants, including the first and second humectant used in the grind mixture, which may be employed in this invention generally include alkylene glycols, polyols, diols, bis-hydroxy terminated thioethers, and lactams.

The first and second humectants may comprise an identical or similar humectant. The first and second humectants may also comprise different humectants. Additional humectants, similar to, identical to, or different from the first and second humectants added to the grind mixture, may also be added to the grind mixture. Humectants similar to, identical to, or different from the humectants added to the grind mixture may be added to the ink formulations.

Alkylene glycols useful as humectants to be added to the ink formulation generally have a molecular weight of from about 50 to about 4,000, preferably from about 50 to about 2,000, more preferably from about 50 to about 1,000. Suitable polyalkylene glycols include polyethylene glycol, polyproylene glycol and copolymers of polyethylene glycol and polypropylene glycol.

Alkylene glycols useful as humectants to be added to the grind mixture, including the first and second humectants, generally have a molecular weight below those alkylene glycols to be added to the ink formulation. In an embodiment, the alkylene glycols useful as humectants in the grind mixture comprise alkylene glycols with a molecular weight below 400. In another embodiment, the alkylene glycols useful as humectants in the grind mixture comprise alkylene glycols with a molecular weight below 200. In another embodiment, the alkylene glycols useful as humectants in the grind mixture comprise ethylene glycol, diethylene glycol, propylene glycol, triethylene glycol and dipropylene glycol.

Polyols useful as humectants in a grind mixture and/or an ink formulation generally contain at least 2 hydroxyl groups or alkyl ether derivatives thereof. Suitable triols include glycerol, trimethylol propane, trimethylol ethane, 1,2,4-butanetriol and 1,2,6-hexanetriol. Suitable tetrols include pentaerythritol, di-(trimethylol propane), and methyl glucosides, while glucose is a suitable pentol. Suitable hexols include sorbitol, dipentaerythritol and inositol. In an embodiment, a polyol useful as a humectant in a grind mixture and/or an ink forumulation comprises glycerol.

Bis-hydroxy terminated thioethers useful as humectants in a grind mixture and/or in an ink formulation have the formula:

wherein each A is independently an aryl group or $(CR_2)_x$, and each R is independently a hydrogen, a $C_{1-6}$ alkyl group, aryl group or a halogen, and x is an integer from about 1 to about 7. In one embodiment, a bis-hydroxy terminated thioether useful as a humectant in a grind mixture and/or an ink formulation comprises 2,2'-thiodiethanol or bis-propanol thioether.

Lactams useful as humectants in a grind mixture and/or in an ink formulation include cyclic amide compounds such as cyclic amides, substituted cyclic amides and cyclic amide derivatives. Suitable lactams include pyrrolidone compounds, valerolactam compounds, caprolactam compounds, imidazolidinone compounds and oxazolidinone compounds. The cyclic amide compound may comprise 2-pyrrolidone, 1-methyl-2-pyrrolidone, 1,5-dimethyl-2-pyrrolidone, 1-ethyl-2-pyrrolidone, 1-propyl-2-pyrrolidone, 1-isopropyl-2-pyrrolidone, 1-butyl-2-pyrrolidone, 1-(2-hydroxyethyl)-2-pyrrolidone, 1-methyl-2-piperidone, valerolactam, 1-ethyl valerolactam, caprolactam, 1-methylcaprolactam, oenantholactam, and mixtures thereof. Suitable imidazolidinone compounds include 1,3-dimethyl-2-imidazolidinone. In an embodiment, a lactam useful as a humectant in a grind mixture and/or an ink formulation comprises 2-pyrrolidone.

In another embodiment, the first humectant may comprise either a polyol or a lactam, and the second humectant may comprise either a polyol or a lactam. In another embodiment, the first humectant may comprise glycerol, diethylene glycol, or 2-pyrrolidone, and the second humectant may comprise glycerol, diethylene glycol, or 2-pyrrolidone.

As used wherein, basic dye is intended to include dye molecules that either have a net positive charge or are insoluble in basic aqueous solutions. Commercial dyes that meet the criteria of a basic dye as previously defined may be used in the present invention, whether they are identified as basic or cationic. Further, it is noted that the cationic charge can be pendant, i.e. insulated from the chromogenic part of the dye, or delocalized, wherein a cationic charge is delocalized in the chromogen. Commercially available dyes which may be employed in this invention include basic dyes listed in the Color Index. Additional dyes include cationic dyes derived from anthraquinone, diphenylmethane, triphenylmethane, acridine, pyran, thiopyran, indamine, azine, oxazine, thiazine, hemicyanine, azacarbocyanine, diazacarbocyanine, triazacarbocyanine and diazahemicyanine as well as dyes which may be classified as cationic azo type dyes. In an embodiment, the basic dyes used in the invention are those basic dyes which are fluorescent.

Examples of dyes potentially useful as basic dyes include, C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39, 40, and 108; C.I. Basic Blue 1, 3, 5, 7, 9, 22, 26, 41, 45, 46, 47, 54, 57, 60, 62, 65, 66, 69 and 71; C.I. Basic Black 8; Astra Blue, and Nigrosine.

Preferred basic dyes that may be employed in the present invention include, but are not limited to, Sevron Brilliant Red 15 (Basic Red 15), Rose Bengal (Acid Red 9), Rhodamine 6G (Basic Red 1), Solvent Violet 49, Pararosaniline base (Basic Red 9), Intrasol brilliant pink 2GL (Disperse Red 86), Rhodamine B base, Basic Fusin, Sevron Yellow R (Basic Yellow 11), Basic Blue 3, Sevron Yellow L (Basic Yellow 13), Astrazon Yellow GRL (Basic Yellow 29), and Astra Blue 6GL.

Waxes that may be included in the grind mixture include, but are not limited to, ethylene homopolymers with molecular weights from 450 to 3000, such as POLYWAX® polyethylene; ethylene-α olefin copolymers with molecular weights from 650 to 1200, such as PETROLITE® copolymers; long chain linear primary alcohols with chain lengths of $C_{14}$-$C_{60}$, such as UNILIN® alcohols; alcohol ethoxylates comprising the reaction product of ethylene oxide and long chain linear primary alcohols, such as UNITHOX® ethoxylates; carboxylic acids with carbon chain lengths of $C_{24}$-$C_{50}$, such as UNICID® acids; oxidized and modified hydrocarbons of molecular weight 450 to 3000; low molecular weight poly-α olefins, such as VYBAR® polymers; and olefin/maleic polymers grafted with ethylene or olefin based polymers, such as CERAMER® polymers.

UV absorber/optical brighteners that may be included in the grind mixture include, but are not limited to, various benzotriazole and benzoxazole derivatives, such as sodium benzotriazolyl butylphenol sulfonate and 2,5-thiophenediyl bis(5-tert-butyl-1,3-benzoxazole).

The aqueous carrier as used in the invention comprises water. The aqueous carrier may further comprise a water miscible solvent. Selection of a suitable deionized water miscible solvent depends on the requirements of the specific aqueous ink being formulated, such as the desired surface tension and viscosity, the colorant being used, the drying time required for the ink, and the type of paper onto which the ink will be printed. Representative examples of water soluble organic solvents that may be selected include (1) alcohols, such as methyl alcohol, ethyl alcohol, n-propyl alcohol, iso-propyl alcohol, n-butyl alcohol, sec-buty alcohol, t-butyl alcohol, iso-butyl alcohol, furfuryl alcohol, and tetrahydrofurfuryl alcohol; (2) ketones or keto alcohols, such as acetone, methyl ethyl ketone, and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or monoethyl)ether, diethylene glycol monomethyl (or monoethyl)ether, propylene glycol monomethyl (or monoethyl)ether, triethylene glycol monomethyl (or monoethyl)ether and diethylene glycol dimethyl (or diethyl)ether; (7) nitrogen-containing cyclic compounds, such as pyrrolidone, N-methyl-2-pyrrolidone, and 1,3-dimethyl-2-imidazolidinone; and (8) sulfur-containing compounds, such as dimethyl sulfoxide and tetramethylene sulfone. Other useful solvents include lactones and lactams.

As used wherein, surfactants are used to modify the surface tension of the ink and to control the penetration of the ink into the paper. Suitable surfactants include, but are not limited to, nonionic, amphoteric and ionic surfactants. Preferred surfactants include, but are not limited to, alkyl sulfate, nonyl phenyl polyethylene glycol, SILWET® (Union Carbide), TERGITOL® (Union Carbide), SURFYNOL® (Air Products and Chemicals, Inc.), and ICONOL™ DA-6 (BASF).

Other additives, such as biocides, viscosity modifiers, penetrants, anti-kogation agents, anti-curling agents, chelating agents, anti-bleed agents, binders and buffers may be added to the ink composition at their art established levels.

The biocides that may be employed in this invention are generally not limited and include biocides that are known and commercially available. Biocides can prevent growth of microorganisms in the ink. Examples of biocides that are suitable for use in this invention include those, for instance, which comprise benz-isothiazolin-one, methyl-isothiazolin-one and chloro-methyl-isothiazolin-one. A preferred biocide includes, but is not limited to, Proxel® GXL (Avecia Ltd.).

Penetrants that may be employed in this invention are generally not limited and includes hydroxy substituted hydrocarbons like 1,2-alkyl diols such as 1,2-pentanediol, 1,2-hexanediol and mixtures thereof. A more detailed description of such penetrants may be found in U.S. Pat. No. 5,364,461.

Suitable chelating agents include sodium ethylene diamine tetraacetate, sodium nitrilotriacetate, sodium hydroxyethyl ethylene diamine triacetate and sodium diethylene triamine pentaacetate.

The binders that may be employed in this invention are generally not limited and include binders that are known and commercially available. Examples of binders include latex polymers comprising acrylic acid, methacrylic acid, alkyl acrylate esters, alkyl methacrylate esters, styrene, or mixtures thereof.

Achieving a desired pH can be obtained by adding either a base or an acid to the prepared ink compositions or to the grind mixture as necessary. Appropriate acids and bases are well known in the art. Should it be necessary to add a base, the base preferably is potassium hydroxide. Should it be necessary to add an acid, the acid preferably is glycolic acid or acetic acid.

Application of the ink jet inks of this invention onto the print substrate can be made by any suitable printing process compatible with the aqueous-based inks, such as flexographic printing, pen plotters, continuous stream ink jet printing, drop-on-demand ink jet printing (including piezoelectric, acoustic, and thermal ink jet processes), or the like. The ink jet ink compositions of this invention are extremely useful in the thermal ink jet printing process. The print substrate employed can be any print substrate compatible with aqueous-based inks, including plain papers, such as commercial bond papers; coated papers (or special ink jet papers), such as those available from Hewlett Packard, Kodak, Ilford, Canon, and Xerox Corporation; textiles; special ink jet papers, including silica coated papers and photorealistic ink jet papers; photographic papers; and ink jet transparency materials suitable for aqueous inks or ink jet printing processes.

The following examples are detailed descriptions of methods of preparation and use of the pigment dispersions and inks of the present invention. The detailed descriptions fall within the scope of, and serve to exemplify, the more general description set forth above. These examples are presented for illustrative purposes only and are not intended as a restriction on the scope of the invention.

EXAMPLES

Example 1

A dispersant and polymer stock solution useful in preparing pigment dispersions and ink compositions of the present invention may be prepare as follows.

A solution of methacrylic acid (23.5 g); SIPOMER SEM/25 (80 g) (containing 60% active ingredient, 20% methacrylic acid and 20% water); nonylphenylpropylene glycol acrylate (12.6 g) (Mw 450); dodecylthiol (6.4 g); dimethyl 2,2'-azobisisobutyrate (V-601™) from Waco Chemical & Supply Co. (0.3 g) were mixed in 75 mL of isopropanol in a three neck round bottom flask equipped with a mechanical stirrer, a condenser, and a thermometer. The mixture was degassed with nitrogen by repeated partial evacuation followed by argon backfill using a Firestone Valve. The flask was back filled with the nitrogen and then immersed in an oil bath and heated to about 75° C. for about 18 hours. The solution was dried in an explosion proof oven and the molecular weight was determined by gel permeation chromatography. The Mw of the resultant dried solution was around 14,000 and the Mn was about 7,500.

A polymer dispersant stock solution was prepared in the following manner: The dried powder of the dispersant was dissolved in deionized water with heating. The temperature was controlled below 50° C. The pH was adjusted to 7.5 by addition of 20% aqueous KOH drop wise.

Example 2

The following is a description of the preparation of a pigment dispersion that includes a dye and a humectant and its use in the preparation of an ink.

Basic Red 15 (15 g) was blended with diethylene glycol (30 g), an aqueous solution of the dispersant from Example 1 (35 g), Pigment Red 122 (90 g), and deionized water (136.4 g) until the grind mixture was uniform. The grind mixture weighed a total of 500 g. The grind mixture was ground in a horizontal mill for approximately 8 to 10 hours to form a pigment dispersion. The final particle size of the pigment dispersion was around 100 nm.

The pigment dispersion was added in an amount to set the percent by weight of pigment in the final ink composition to 3%. The amount of other ingredients in the final ink composition was 7.5% dipropylene glycol, 7.5% glycerol, 0.5% SURFYNOL® 465, and with the balance being deionized water.

Example 3

The following is a description of the preparation of a pigment dispersion that includes a dye and two humectants and its use in the preparation of an ink.

Basic Red 15 (15 g) was blended with glycerol (15 g), 2-pyrrolidone (15 g), an aqueous solution of the dispersant from Example 1 (35 g), Pigment Red 122 (90 g), and deionized water (136.4 g) until the grind mixture was uniform. The grind mixture weighed a total of 500 g. The grind mixture was ground in a horizontal mill for approximately 8 to 10 hours to form a pigment dispersion. The final particle size of the pigment dispersion was around 100 nm.

The pigment dispersion was diluted to 20% solids with water and was added in an amount to set the percent by weight of pigment in the final ink composition to 3%. The amount of other ingredients in the final ink composition was 7.5% dipropylene glycol, 7.5% glycerol, 0.5% SURFYNOL® 465, and with the balance being deionized water.

Example 4

A pigment dispersion and an ink formulation were prepared following the same procedure described in Example 3, except that an attritor was used to grind the grind mixture for approximately 12 to 15 hours.

Example 5

The following is a description of the preparation of a pigment dispersion that includes a dye and a humectant and its use in the preparation of an ink.

Astra Blue 6GL (6 g) was blended with 1,5-pentanediol (6 g), an aqueous solution of the dispersant from Example 1 (7 g), Pigment Blue 15-3 (18 g), and deionized water (60 g) until the grind mixture was uniform. The grind mixture was ground in an attritor with YTZ beads (0.25 mm) for approximately 12 hours to form a pigment dispersion. The final particle size of the pigment dispersion was around 85 nm.

The pigment dispersion was added in an amount to set the percent by weight of pigment in the final ink composition to 3%. The amount of other ingredients in the final ink composition was 7.5% dipropylene glycol, 7.5% glycerol, 0.5% SURFYNOL® 465, and with the balance being deionized water.

Example 6

The following is a description of the preparation of a pigment dispersion that includes a dye and a humectant and its use in the preparation of an ink.

Astra Blue 6GL (3 g) was blended with glycerol (6 g), an aqueous solution of the dispersant from Example 1 (7 g), Pigment Blue 15:4 (18 g), and deionized water (60 g) until the grind mixture was uniform. The grind mixture was ground in an attritor with YTZ beads (0.25 mm) for approximately 12 hours to form a pigment dispersion. The final particle size of the pigment dispersion was around 85 nm.

The pigment dispersion was added in an amount to set the percent by weight of pigment in the final ink composition to 3%. The amount of other ingredients in the final ink composition was 7.5% dipropylene glycol, 7.5% glycerol, 0.5% SURFYNOL® 465, and with the balance being deionized water.

Example 7

Comparative Ink A

Comparative Ink A was prepared by the same process as described in Example 3, except that no humectants were included in the grind mixture.

The pigment dispersion was prepared from a grind mixture containing Basic Red 15, an aqueous solution of the dispersant from Example 1, Pigment Red 122, and deionized water. The final particle size of the pigment dispersion was about 100 nm.

The pigment dispersion was added in an amount to set the percent by weight of pigment in the final ink composition to 3%. The amount of other ingredients in the final ink composition was 7.5% dipropylene glycol, 7.5% glycerol, 0.5% SURFYNOL® 465, and with the balance being deionized water.

Example 8

Comparative Ink B

Comparative Ink B was prepared by the same process as described in Example 3, except that no humectant was added to the grind mixture, and the humectants glycerol and 2-pyrrolidone were added to the ink in the ink making process.

The pigment dispersion was prepared from a grind mixture containing Basic Red 15, the dispersant in Example 1, Pigment Red 122, and deionized water. The final particle size of the pigment dispersion was about 100 nm.

The pigment dispersion was added in an amount to set the percent by weight of pigment in the final ink composition to 3%. The amount of other ingredients in the final ink composition was 7.5% dipropylene glycol, 8.0% glycerol, 0.5% SURFYNOL® 465, 0.5% of 2-pyrrolidone, and with the balance being deionized water.

Example 9

The inks prepared in Examples 2, 3, 4, 7, and 8 were tested for their performance in three different categories, and table 1 lists the results of these tests. The first category tested was Idle Time which is measured as the maximum time for a nozzle to idle before failing and producing a print quality defect. Higher numbers are desired for Idle Time. The second category tested was Million Fires which is measured as the maximum number of million fires before the nozzle fails and produces a print quality defect. Higher numbers are desired for Million Fires. The third category tested was Missing Nozzle which is measured as the cumulative number of missing/failed nozzles after 20 consecutive pages of printing. Lower numbers are desired for Missing Nozzle. The printhead used for the tests listed in table 1 was the printhead used on the Lexmark® Z65 Color Jetprinter. The printhead was a duel drop printhead with drop sizes of 4 ng for the smaller nozzle and 10 ng for the larger nozzle.

TABLE 1

| Ex. | Colorants in Dispersion | Humectant in grind mixture | Idle Time (sec) Small/Large | Million Fires Small/Large | Missing Nozzle Small |
|---|---|---|---|---|---|
| 2 | PR122/BR15 | DEG | 5.6/9.6 | 4.3/3.7 | 31 |
| 3 | PR122/BR15 | 2P/Gly | 5.1/7.1 | 6.0/4.0 | 34 |
| 4 | PR122/BR15 | 2P/Gly | 2.5/3.2 | 4.7/7.0 | 33 |
| 7 | PR122/BR15 | none | <2sec/<2sec. | 0/0 | 320 |
| 8 | PR122/BR15 | none | <2sec/2.1 | 0/0 | 255 |

The results shown in table 1 demonstrate that preparing a pigment dispersion with a humectant as described in Examples 2, 3, and 4, can improve the performance of the ink when measuring Idle Time, Million Fires, and Missing Nozzle. For example, comparing the performance of Examples 3 or 4 to the performance of Examples 7 and 8 shows that removing humectants from a grind mixture and/or adding the humectants glycerol and 2-pyrrolidone after the pigment dispersion is prepared does not have the same effect as adding the same humectants during the preparation of the pigment dispersion.

Example 10

The following is a description of the preparation of pigment dispersion using a horizontal mill. Basic Red 15 dye was blended with the two humectants, 2-pyrrolidone and glycerol, until the grind mixture was uniform. The dispersant stock solution described in Example 1 and water were added to the uniform grind mixture. Finally, Pigment Red 122 was added. The grind mixture was mixed by a spatula, though for scale up other means such as an agitator or homogenizer may be necessary. The percent by wieght of each ingredient in the premix is show in table 2. The ratio between the Pigment Red 122 and each of the other ingredients in the premix is shown in table 3.

TABLE 2

Grind Mixture Formulation Based on 100 Parts by Mass Total

| Ingredient | |
|---|---|
| DI water | 23.0 |
| Dispersant (14% Active in water) | 50.0 |
| Dye (100% active) | 3.0 |
| 2-pyrrolidone (100% Active) | 3.0 |
| Glycerol (100% Active) | 3.0 |
| Pigment (100% Active) | 18.0 |
| Total | 100.0 |
| Percent solids | 28% |

TABLE 3

Ratios of Ingredients in Grind Mixture

| Ingredient | |
|---|---|
| Pigment: Dispersant | 2.6:1 |
| Pigment: Dye | 6:1 |
| Pigment: 2-Pyrrolidone | 6:1 |
| Pigment: Glycerol | 6:1 |

The following information in table 4 details the milling process used for the grind mixture described above.

TABLE 4

| Mill Conditions | |
|---|---|
| Mill | Mini 250 Eiger horizontal wet mill |
| Media | Polystyrene 0.6–0.9 mm |
| Media quantity | 200 ml |
| Mill Time | about 8 hrs |

The final particle size was between 85 and 100 nm.

The pigment dispersion was then diluted to approximately 20% solids content, filtered through a 6.0 µm PALL filter, and stored for ink making.

Example 11

An ink composition may be prepared by mixing the pigment dispersion described in Example 10 (P:D 2.6:1) with dipropylene glycol, glycerol, Iconol™ DA 6, and deionized water. The pigment dispersion was added in an amount to set the percent by weight of pigment in the final ink composition to 3%. The amount of other ingredients in the final ink composition was 7.5% dipropylene glycol, 7.5% glycerol, 0.5% Iconol™ DA 6, and with the balance being deionized water.

The order of addition was as follows: water, Iconol™ DA 6, glycerol, dipropylene glycol, and pigment dispersion. The ink composition was mixed for about 45 min to 1 hr. Finally, the pH was adjusted between 8-8.5, and the ink was filtered through a 1.2 µm filter.

Example 12

Comparative Ink C

A comparative ink composition was prepared by the same process as described in Examples 10 and 11, except that no dye was used in the grinding process. The pigment dispersion was prepared from a grind mixture containing glycerol, 2-pyrrolidone, the dispersant in Example 1, Pigment Red 122, and deionized water. The final particle size was about 100 nm. The comparative ink composition was prepared by mixing the pigment dispersion (P:D 2.6:1) with dipropylene glycol, glycerol, Iconol™ DA 6, and deionized water. The pigment dispersion was added in an amount to set the percent by weight of pigment in the final ink composition to 3%. The amount of other ingredients in the final ink composition was 7.5% dipropylene glycol, 7.5% glycerol, 0.5% Iconol™ DA 6 and with the balance being deionized water.

Example 13

The ink from Example 11 and Comparative Ink C were printed on Hammermill Laser Print paper (HMLP) using the Lexmark® Z65 Color Jetprinter. The Gamut Volume distribution vs. Hue Angle/Color was computed using 125 color space and an X-Rite spectrophotometer.

Figure 1:
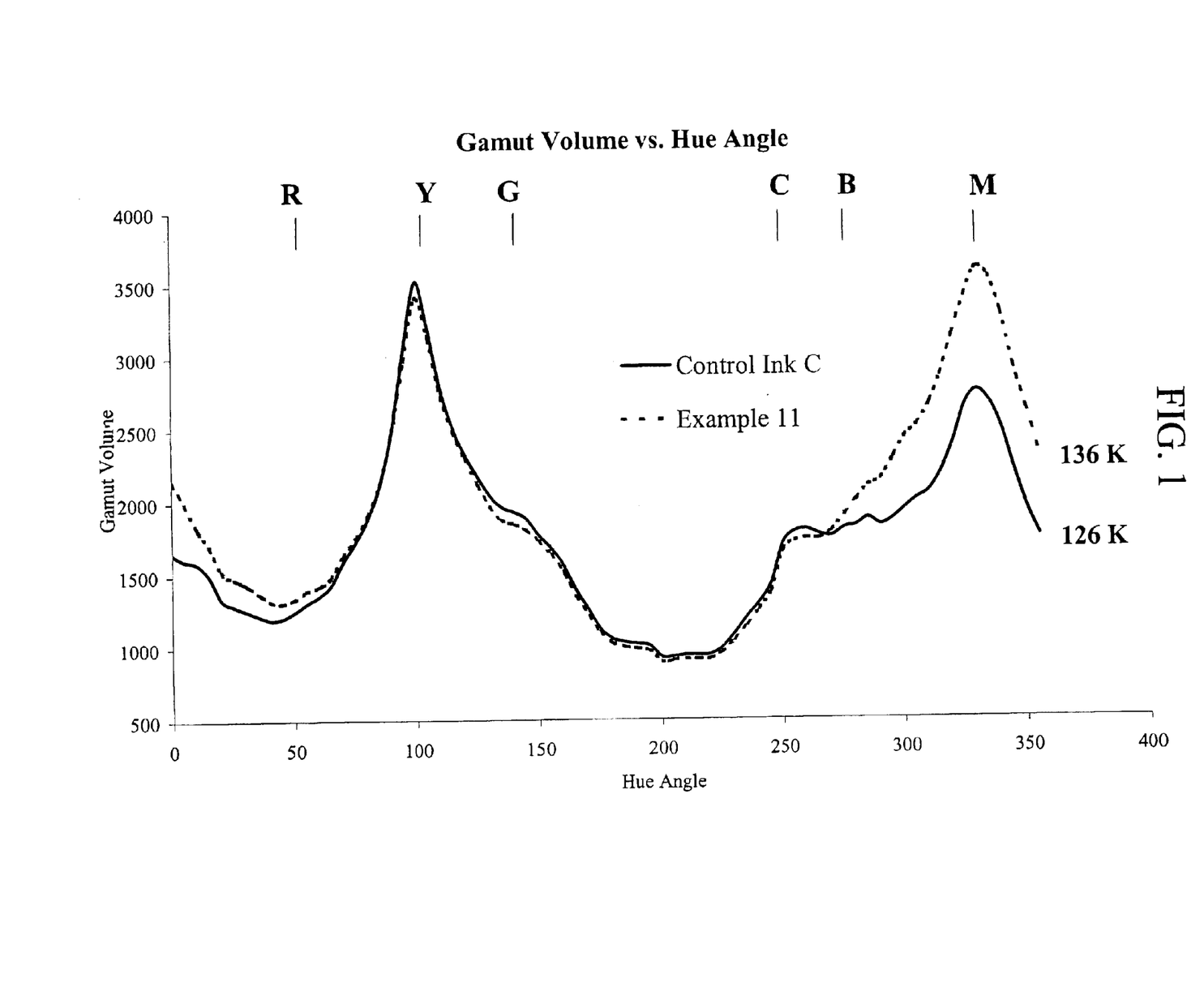
FIG. 1 is a graph of Gamut Volume distribution vs. Hue/Angle Color for an ink of the present invention and a comparative ink.

A graph of Gamut Volume distribution vs. Hue Angle/Color illustrates the relative contribution of each colorant to the overall gamut volume. The results are graphed in FIG. 1 which shows that the ink from Example 11 has about 10,000 additional gamut volume units than Comparative Ink C. Further, FIG. 1 shows that the addition gamut volume units are primarily located in the area of blue, red, and magenta colors. This demonstrates that the dyes added to these ink compositions contribute to the ink's chroma in one area of the visible spectrum.

Table 5 shows Gamut volume units for Comparative Ink C and the ink described in Example 11 on four different types of plain multipurpose paper. Table 5 also shows the average gamut volume units for Comparative Ink C and the ink of Example 11. The results in table 5 show that improved chroma of the ink of Example 11 is not necessarily dependent on the type of plain paper used. In table 5, HMLP refers to Hammermill Laser Print paper, Cascade X9000 refers to Boise Cascade X9000 copy paper, Hewlett Packard multipurpose refers to Hewlett Packard Multipurpose™ paper, MP Relay refers to Hammermill International Paper Relay™ MP paper.

TABLE 5

Gamut Volume Units of Ink of Example 11 on Various Papers

| Paper | Comparative Ink C | Example 10 |
| --- | --- | --- |
| HMLP | 125,852 | 136,205 |
| Cascade X9000 | 89,292 | 99,653 |
| Hewlett Packard multipurpose | 97,124 | 106,724 |
| MP Relay | 99,221 | 109,357 |
| Average | 102,872 | 112,985 |

Example 14

The following is a description of the preparation of a pigment dispersion that includes a humectant and its use in the preparation of an ink.

Pigment Red 122 (85 g) was blended with glycerol (14.2 g), 2-pyrolidone (14.2 g), an aqueous solution of the dispersant from Example 1 (33.1 g) (11.4% active), and deionized water (3.98 g) until the grind mixture was uniform. The grind mixture weighed a total of 400 g.

The grind mixture was ground in a horizontal mill for approximately 8 to 10 hours to a form a pigment dispersion. The final particle size of the pigment dispersion was around 100 nm.

The pigment dispersion was added in an amount to set the percent by weight of the pigment in the final ink formulation composition to 3%. The amount of other ingredients in the final ink composition was 7.5% dipropylene glycol, 7.5% glycerol, 0.5% SURFYNOL® 465, and with the balance being deionized water.

Example 15

Comparative Ink D

A comparative ink composition was prepared by the same process described in Example 14, except no humectants were used in the grinding process.

The pigment dispersion was prepared from a grind mixture containing Pigment Red 122 (85 g), an aqueous solution of the dispersant from Example 1 (33.1 g) (11.4% active), and deionized water (32.32 g) until the grind mixture was uniform. The grind mixture weighed a total of 400 g.

The pigment dispersion was added in an amount to set the percent by weight of the pigment in the final ink formulation composition to 3%. The amount of other ingredients in the final ink composition was 7.5% dipropylene glycol, 7.5% glycerol, 0.5% SURFYNOL® 465, and with the balance being deionized water.

Example 16

The inks prepared in Examples 14 and 15 were tested for their performance in three different categories, and table 6 lists the results of these tests. The categories tested were Idle Time, Million Fires, Missing Nozzle. A description of these categories is provided in Example 9. The printhead used for the tests listed in table 6 was the printhead used in the Lexmark® Z65 Color Jetprinter. The printhead was a duel drop printhead with drop sizes of 4 ng for the smaller nozzle and 10 ng for the larger nozzle.

TABLE 6

| Ex. | Colorants in Dispersion | Humectant in grind mixture | Idle Time (sec) Small/Large | Million Fires Small/Large | Missing Nozzle Small |
| --- | --- | --- | --- | --- | --- |
| 14 | PR122 | 2P/Gly | 12/8 | 15/15 | 9 |
| 15 | PR122 | none | 13/7.6 | 12/15 | 109 |

The results shown in table 6 demonstrate that preparing a pigment dispersion with a humectant in the grind mixture, as described in Example 14, can improve the performance of an ink. For example, comparing the reliability of Example 14 to Example 15 through the measure of nozzle drop out rate (Missing Nozzle) shows that Example 14 possesses improved reliability.

In summary, numerous benefits have been described which result from employing the concepts of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. An ink composition comprising:

an aqueous carrier; and a pigment dispersion produced by
      grinding a grind mixture comprising a pigment, a polymeric dispersant, water, and a first humectant.

2. The ink composition of claim 1, wherein the pH of the ink composition is greater than or equal to 7.

3. The ink composition of claim 1, wherein the grind mixture further comprises a second humectant, a wax, a UV absorber/optical brightener, or mixtures thereof.

4. The ink composition of claim 1, wherein the grind mixture further comprises a basic dye and wherein the pH of the grind mixture is greater than or equal to 7.

5. The ink composition of claim 4, wherein the ratio of pigment to basic dye in the grind mixture ranges from about 20:1 to about 1:1.

6. The ink composition of claim 4, wherein the basic dye fluoresces.

7. The ink composition of claim 4, wherein the basic dye comprises: Basic Red 15, Acid Red 9Basic Red 1, Solvent Violet 49, Basic Red 9, Disperse Red 86, Basic Yellow 11, Basic Blue 3, Basic Yellow 13, or Basic Yellow 29.

8. The ink composition of claim 1, wherein the ratio of pigment to total humectant in the grind mixture ranges from about 20:1 to about 4:1.

9. The ink composition of claim 1, wherein the grind mixture further comprises a second humectant, and wherein the first and second humectants comprise glycerol, diethylene glycol, or 2-pyrrolidone.

10. The ink composition of claim 1, wherein the ratio of pigment to dispersant in the grind mixture ranges from about 1:2 to about 20:1.

11. The ink composition of claim 1 further comprising the step of: diluting the pigment dispersion with an aqueous solution.

12. The ink composition of claim 1 further comprising the step of: filtering the pigment dispersion.

13. The ink composition of claim 1, wherein the pigment comprises Pigment Red 122, Pigment Blue 15, 53, and 15:4, or Pigment Yellow 74, 128, 138, 155.

14. The ink composition of claim 1, wherein the dispersant comprises a polymer comprising a hydrophobic segment and a hydrophilic segment.

15. The ink composition of claim 14, wherein the dispersant comprises a polymer having an acid number less than or equal to 25.

16. An ink composition comprising: a pigment; a polymeric dispersant; a first humectant; a basic dye; and an aqueous carrier, wherein the pH of the ink composition is greater than or equal to 7.

17. The ink composition of claim 16, wherein the ratio of pigment to basic dye ranges from about 20:1 to about 1:1.

18. The ink composition of claim 16, wherein the basic dye fluoresces.

19. The ink composition of claim 4, wherein the basic dye comprises: Basic Red 15, Acid Red 9, Basic Red 1, Solvent Violet 49, Basic Red 9, Disperse Red 86, Basic Yellow 11, Basic Blue 3, Basic Yellow 13, or Basic Yellow 29.

20. The ink composition of claim 16, wherein the pigment comprises: Pigment Red 122, Pigment Blue 15:3, and 15:4, or Pigment Yellow 74, 128, 138, 155.

21. The ink composition of claim 16 further comprising a second humectant, wherein the first and second humectants comprise glycerol, diethylene glycol, or 2-pyrrolidone.

22. The ink composition of claim 16, wherein the ink composition further comprises a surfactant, a biocide, a wax, a UV absorber/optical brightener, and mixtures thereof.

23. The ink composition of claim 16, wherein the ratio of pigment to dispersant ranges from about 1:2 to about 20:1.

24. The ink composition of claim 16, wherein pigment is present in an amount of from about 0.5% to about 10% by weight.

25. The ink composition of claim 16, wherein polymeric dispersant is present in an amount of from about 3% to about 65% by weight.

26. A method for printing using an inkjet printer comprising: printing an ink jet ink of claim 1 onto a printing medium.

27. A method for printing using an inkjet printer comprising: printing an ink jet ink of claim 15 onto a printing medium.

* * * * *

UNITED STATES PATENT AND TRADEMARK OFFICE
CERTIFICATE OF CORRECTION

PATENT NO. : 6,896,724 B2
DATED : May 24, 2005
INVENTOR(S) : Jing Sun et al.

It is certified that error appears in the above-identified patent and that said Letters Patent is hereby corrected as shown below:

Column 17,
Line 36, replace "9Basic" with -- 9, Basic --.

Column 18,
Line 4, replace "15, 53," with -- 15:3, --.

Signed and Sealed this

Twenty-seventh Day of September, 2005

JON W. DUDAS
*Director of the United States Patent and Trademark Office*